Sept. 7, 1926.
L. L. E. CROWE
1,599,319
ECCENTRIC BEARING FOR CONNECTING RODS
Filed Dec. 17, 1924     3 Sheets-Sheet 1
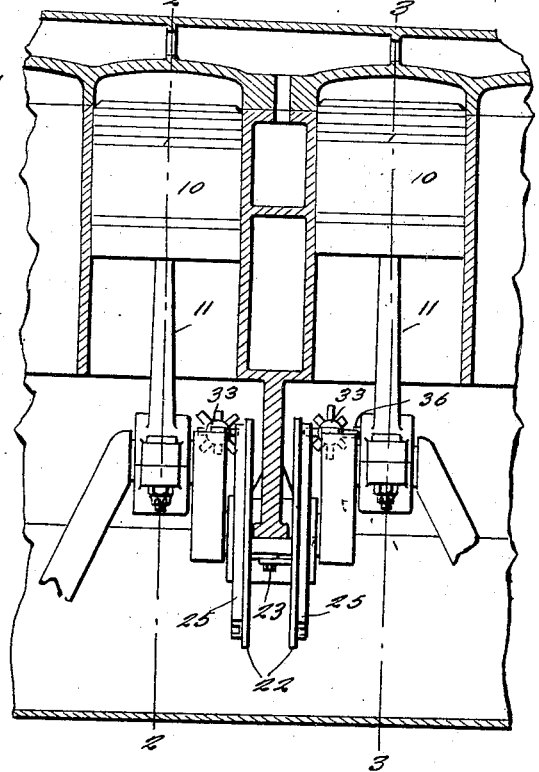
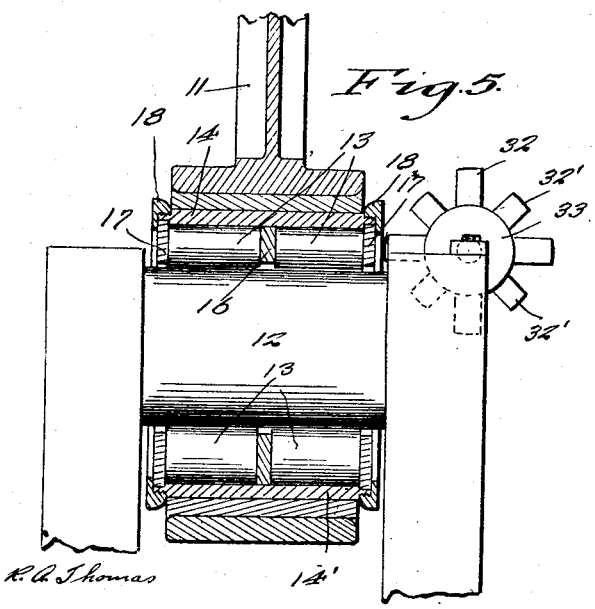
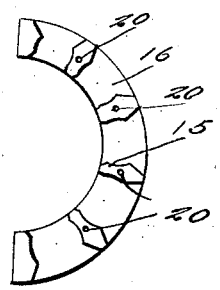
L.L.E. Crowe
INVENTOR
BY Victor J. Evans
ATTORNEY Sept. 7, 1926.
L. L. E. CROWE
1,599,319
ECCENTRIC BEARING FOR CONNECTING RODS
Filed Dec. 17, 1924   3 Sheets-Sheet 2
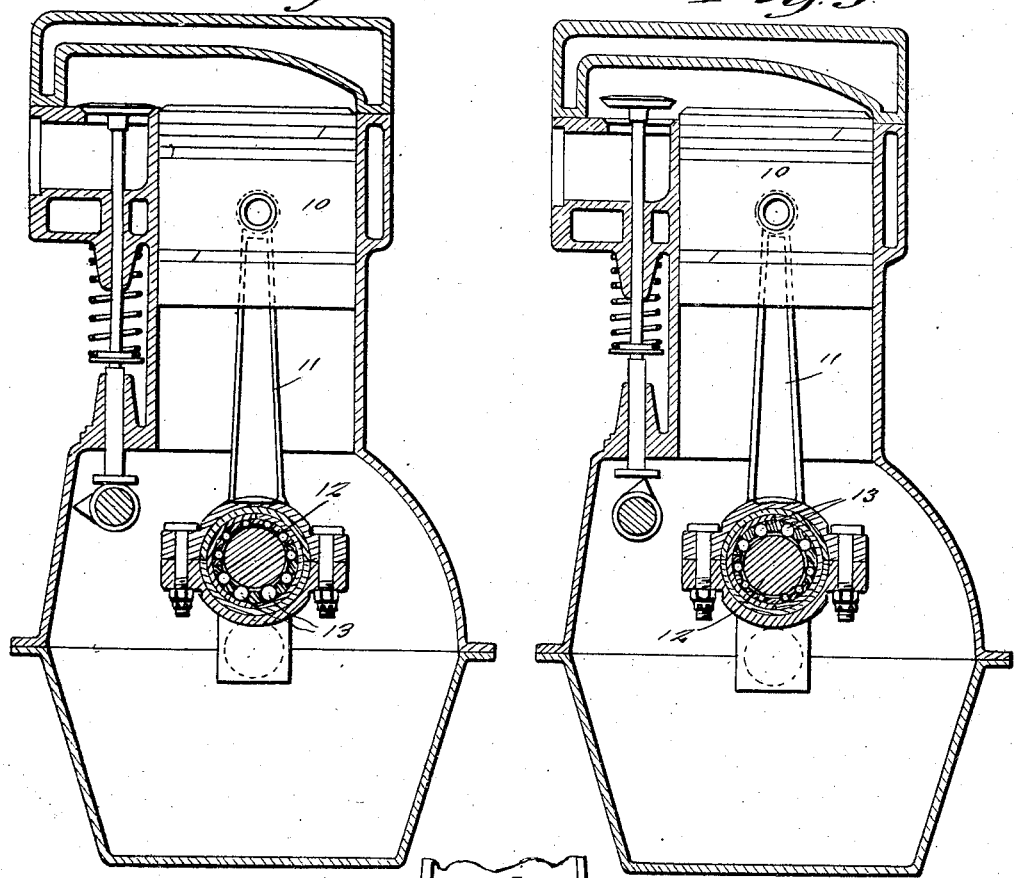
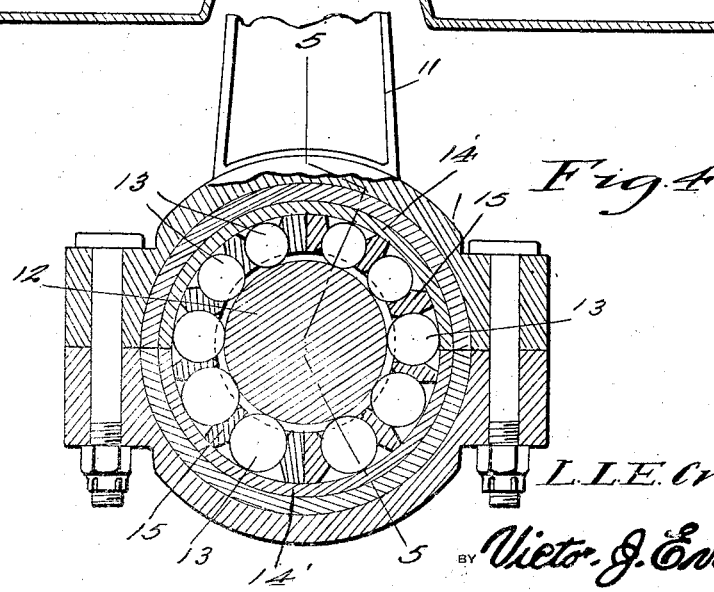

Sept. 7, 1926.

L. L. E. CROWE

ECCENTRIC BEARING FOR CONNECTING RODS

Filed Dec. 17, 1924    3 Sheets-Sheet 3

L. L. E. Crowe  INVENTOR

BY Victor J. Evans
ATTORNEY

WITNESS:

Patented Sept. 7, 1926.

1,599,319

UNITED STATES PATENT OFFICE.

LLOYD L. E. CROWE, OF BELOIT, WISCONSIN.

ECCENTRIC BEARING FOR CONNECTING RODS.

Application filed December 17, 1924. Serial No. 756,574.

The object of this invention is to provide for the automatic control of the bearing of a connecting rod of a four-cycle internal combustion engine, so that the length of the stroke during the intake of fuel may be increased, and may be increased also during the exhaust,—the power and compression strokes usually being of normal length.

A further object is to provide for the eccentric mounting of the connecting rod with reference to the crank pin.

A still further object is to increase the efficiency of the engine, by employing the construction specified.

With the foregoing and other objects in view, the invention consists in the novel construction and arrangement of elements described illustrated and claimed, it being understood that modifications may be made within the scope of the claims without departing from the spirit of the invention.

In the drawings forming part of this application,—

Figure 1 shows a portion of an engine in vertical section, with my improvement applied thereto.

Figure 2 is a vertical section, on line 2—2 of Figure 1.

Figure 3 is a vertical section on line 3—3 of Figure 1.

Figure 4 is a section thru one of the elements of the crank shaft and a bearing therefor, the rollers for the bearing being of different diameter.

Figure 5 is a section on line 5—5 of Figure 4.

Figure 6:
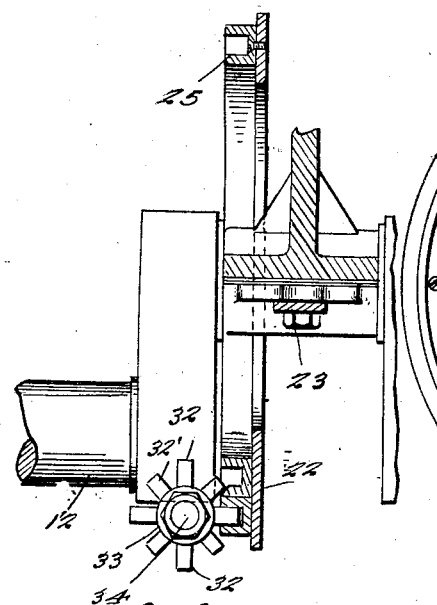
Figure 6 is a fragmentary view in section showing the cooperation between the cam wheel and star wheel.
Figure 7:
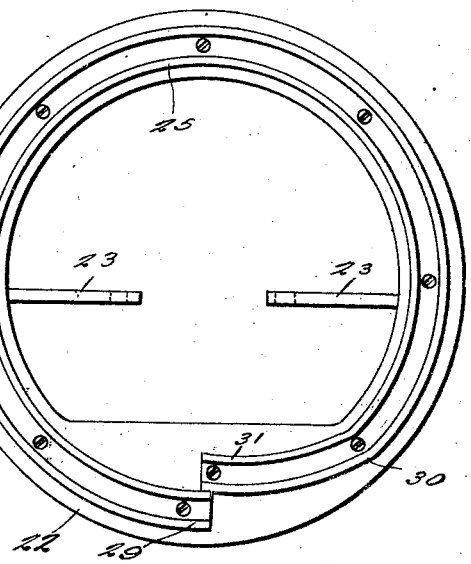
Figure 7 shows the cam wheel of Figure 6 in elevation.
Figure 9:
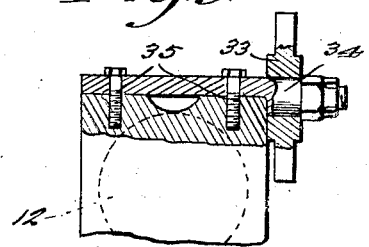
Figure 9 is a detail view showing the mounting of the star wheel.
Figure 8:
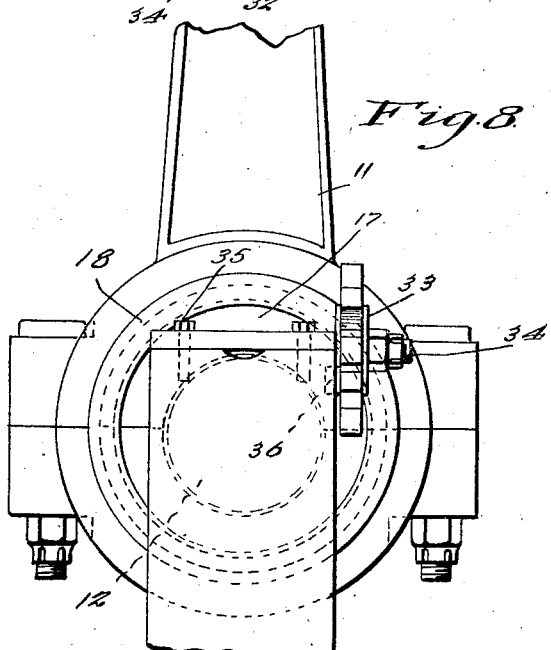
Figure 8 is a detail in elevation, showing the structure as if looking from the right in Figure 5.
Figure 10:
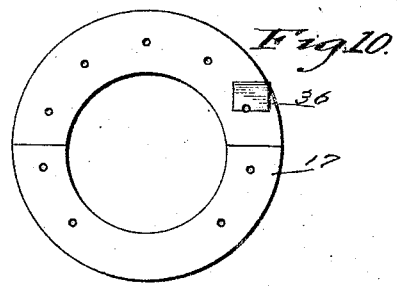

Figure 10 is a detail in elevation, showing the ring member 17 of Figures 5 and 8, and showing lug 36 thereon.

Figure 11 is a detail view of one of the race ways, or a portion thereof.

The piston rod 10 of a four-cycle engine imparts motion to a connecting rod 11 with which crank pin 12 cooperates. The crank pin passes through a roller bearing including rollers 13 of different diameter and of the relative proportions shown, whereby the crank pin is mounted eccentrically with reference to the end of the connecting rod. A container or casing for the rollers includes sleeves 14 and 14′, the device being made in sections to permit of assembly with reference to the crank pin. The connecting rod is made especially for use in the manner here described.

The rollers are assembled in cage or cages 15 and on opposite sides of a separating wall 16, and outer retaining disks 17 are held by flanged rings 18 which engage sleeve 14. Dowel pins 20 pass between the rollers and through disks 17, and retain the elements of the roller bearing in position. The crank pin 12 turns in the eccentric bearing thus formed, during the compression and power strokes, which are of normal length, but the position of the bearing is determined automatically by cam mechanism, the stroke being increased for the intake of fuel and for the exhaust, by say one-eighth of an inch.

A disk or plate 22 is fixedly mounted at 23, and has fixed on one side thereof a channel member 25 concentric with the center of the disk between points 29 and 30, but deflected as shown between points 30 and 31. This provides a cam groove to be engaged by teeth of star wheel 33 rotatable on stud 34. This stud is mounted at 35, and alternate teeth 32 of the star wheel are longer than intervening teeth 32′. The star wheel is rotated through an angle of 45 degrees by the deflected portion of the cam groove, between points 30 and 31.

One of the disks 17 carries a lug or projecting portion 36 which engages the long teeth 32, but not the teeth 32′, so that when the star wheel is in the position at the left of Figure 1 the crank pin 12 is free with reference to the roller bearing, but when portion 30—31 of the cam grooved member rotates the star wheel to the position at the right of Figure 1, a long tooth is in contact with lug 36, and the roller bearing becomes locked with reference to the crank pin, rollers 13 then being in the position indicated in the view last named, and providing a stroke of increased length for the intake of fuel and for the exhaust of gases after the explosion. The increase in the length of the stroke is equal to the difference in the diameter of the small rollers and the larger ones.

When the star wheel is again rotated by the further rotation of the crank, a short tooth is opposite lug 36, and there is clearance at this point, so that no locking of the bearing takes place, and as before indicated this free movement occurs during the compression and power strokes.

The exhaust gases will be more completely dispelled than under usual conditions, as the piston moves further into the cylinder, and the increased amount of fuel taken in during the long intake stroke will be more nearly pure. The pressure at the end of the intake stroke will approach atmospheric pressure. The efficiency of the engine is increased and the consumption of fuel reduced, owing to the more complete combustion thereof.

What I claim is:

1. The combination with a crank element and connecting rod, of a bearing including a series of rollers of different diameter, mounted between the crank element and the connecting rod, and means for changing the relative position of the bearing for effecting an eccentric connection between the crank element and connecting rod.

2. The combination with a crank element and connecting rod, of a bearing including a series of rollers of different diameter, mounted between the crank element and connecting rod, and automatically operated means for changing the relative position of the bearing, the crank element, and the connecting rod.

3. The combination with a crank element and connecting rod, of a bearing including a series of rollers of different diameter, mounted between the crank element and connecting rod, and cam controlled means for changing the relative position of the bearing, the crank element, and the connecting rod, said means including a lug carried by an element of the bearing, and a wheel having long and short teeth engaged by the cam, the long teeth contacting with the lug and locking the bearing.

4. The combination with a crank element and connecting rod, of a bearing including a two-part casing and two series of rollers, the rollers in the respective series being of different diameter, and said bearing being mounted between the crank element and connecting rod, and means for locking the bearing with reference to the crank element, said means including a lug carried by an element of the bearing, and a cam controlled element having long and short teeth, the long teeth engaging the lug for preventing movement of the bearing relative to the crank element.

5. The combination with a crank element and connecting rod, of a bearing including a two-part casing and two series of rollers, the rollers in the respective series being of different diameter, and said bearing being mounted between the crank element and connecting rod, means for automatically and temporarily locking the bearing with reference to the crank element, said means including a lug carried by an element of the bearing, and a cam controlled element having long and short teeth, the long teeth engaging the lug for preventing movement of the bearing relative to the crank element.

In testimony whereof I affix my signature.

LLOYD L. E. CROWE.